Patented Dec. 1, 1931

1,834,622

UNITED STATES PATENT OFFICE

LESLIE G. JENNESS, OF BROOKLYN, NEW YORK, ASSIGNOR TO INTERMETAL CORPORATION, OF NEW YORK, N. Y., A CORPORATION OF DELAWARE

REDUCTION OF METALS FROM ORES

No Drawing.   Application filed May 18, 1929.  Serial No. 364,340.

The present invention relates to the reduction of metals and metallic ores. More particularly, it relates to a method for selectively reducing the oxy compounds of metals in such ores.

The use of chlorine to separate a single valuable constituent of a metallic aggregate from the others contained therein is well known in the art. Sulphur monochloride for chlorination has also been used in some cases for similar purposes. It has further been proposed to treat metal aggregates with chlorine at a temperature at which all the metals in the aggregate will form chlorides and pass out of the furnace in a gaseous form and then subsequently to subject this gas to lower temperatures sufficient to condense various metals therefrom.

This condensation method is for many reasons very unsatisfactory. It has been found for example that at any given condensation temperature there is an incomplete precipitation of the desired constituent and that, as a consequence, there is no sharp separation and the resulting precipitates are ill defined and have a tendency to mingle one with another.

I have, however, discovered that metals and groups of metals may be separated from each other by a process hereinafter described which comprises selective reduction, simultaneous chlorination and volatilization in the presence of sulphur higher chlorides and chlorine at regulated temperatures. Oxy compounds of any given metal contained in the ore will be reduced at a given predetermined temperature, while the similar compounds of the remaining metals will ordinarily be unaffected thereby at that temperature. Essentially the method consists in passing sulphur higher chlorides and chlorine together over the ore while the temperature in the furnace is regulated progressively to arrive at that at which each desired constituent will, after chlorination, volatilize. If chlorine alone were passed over, there would be little or no volatilization of this constituent at the low temperature employed as the chlorine will act efficiently upon it only when it is in metallic form. Without the presence of the sulphur higher chloride in the chlorine the reduction would necessarily depend upon the temperature only. With sulphur higher chloride and chlorine together, however, particularly in the case of oxy compounds of metals, the oxygen is taken up rapidly by the sulphur chloride and the metal, thus reduced, is simultaneously chloridized and the chloride vaporized when the volatilization point of the chloride is reached. The furnace temperature will thus be first regulated at about the temperature at which a given desired metal will chlorinate and at which such chloride will volatilize. When this correlation of temperature is reached such constituent will then rapidly reduce, chlorinate and volatilize, all other constituents in the ore remaining unaffected. Thereupon the furnace temperature will be raised and regulated at about the next higher temperature at which a similar result will be produced with another metal and this is then similarly recovered. The process may be continuous so that each metal in the ore may be separately recovered as chloride.

By the employment of the method of the present invention, the oxy compounds of any given metal contained in the ore will be reduced at given predetermined temperatures while the remaining oxy compounds in the ore will be unaffected. Each oxy compound is thus selectively reduced and chlorinated at a temperature at which or higher than that at which its chloride will volatilize.

If, for instance, tantalum oxide and columbium oxide are treated at 200° C. with sulphur dichloride and chlorine ($SCl_2$ plus $Cl_2$), reduction, chlorination and volatilization can take place for the columbium but not for the tantalum. Thus, the sulphur chloride ingredient of my reagent comprises the higher chlorides of sulphur, preferably the dichloride, as distinguished from the lower or monochloride of sulphur which is ineffective and in fact detrimental in my process. When sulphur monochloride with or without an admixture of chlorine is used to chlorinate a metallic oxide, a higher temperature as compared with my process is necessary and the direct products of the reaction are entirely different from those resulting from my process and comprise the ordinary single metallic chloride and sulphur dioxide. Evidently this columbium end-product, formed and volatilized at 200° C., is a different product from the ordinary or normal columbium chloride (CbCl$_5$) whose boiling point is 240° C. If chlorine alone be passed over these constituents, the chlorides cannot be formed at this temperature and therefore no volatilization of either occurs. Nor would this occur with chlorine alone before a temperature far higher was reached, and even then both would go off together. This demonstrates that with chlorine alone, chlorination of a single desired constituent separately from others cannot be effected for the reason that chlorination of any one of the constituents occurs only at temperatures above the volatilization points of practically all. Therefore when chlorination of one occurs a number are chlorinated and volatilized together.

By the method of the present invention therefore, the oxy compound is selectively reduced and chlorinated ordinarily at a temperature below that of the volatilization point of the chloride of its metal. If, however, a given constituent cannot be reduced at a temperature lower than that at which another constituent present in the ore can be reduced, the chlorination and volatilization of the second constituent will first take place. This is true, even though the chloride of the first constituent will ordinarily volatilize at a lower temperature. A good illustration occurs in the separation of tantalum oxide (Ta$_2$O$_5$) from stannic oxide (SnO$_2$). Sulphur dichloride readily reduces the tantalum oxide at 300° C., and does not reduce the stannic oxide until about 550°. Although the volatilization temperature of stannic chloride is far below that of tantalum chloride, the tin remains behind at 300° C. since it cannot be converted to the volatile form at that temperature.

In some cases it may be desirable to separate metals as a group which can then be individually separated readily by other chemical means or by a second volatilization according to the present invention. This would be true in the cases of the more refractory ores, as, for instance, in the case of the separation of aluminum and beryllium silicates, where the temperatures of reduction are higher than in the oxide ores. Similarly, tantalum oxide and columbium oxide may be simultaneously separated as chlorides from the tantalite and columbite ores. Aluminum and titanium chlorides may be also driven off together from bauxite. In such cases these chlorides may be later separated from each other by regulation of temperature.

A study of the action involved indicates that the oxide ore compounds are first reduced by the sulphur dichloride and subsequently chlorinated by the chlorine present. If the vapor pressure of the resulting chloride or oxychloride were appreciable at the temperature maintained, the metal would pass off in the gaseous state in the form of a chloride. Since the temperatures at which reduction of various oxides and compounds may be effected varies over a wide range, and since also the vapor pressure of the chlorides of the metals varies widely, the method can be applied extensively to the selective reduction of many ores and to the separation of their valuable constituents by merely regulating the temperature at which chlorination is permitted.

What I claim is:—

1. A method of separation of metals from ore which comprises chloridizing each metal separately from all others in said ore by passing sulphur higher chloride and chlorine over said ore in a finely divided state; then raising the temperature to the volatilization point of the particular metallic chloride so formed; then continuously raising the temperature to the chlorination and volatilization points of the chlorides of each other metallic constituent one by one in ascending order of the volatilization of their chlorides.

2. A method of separation from ore of each metal contained therein which comprises the passing of sulphur higher chloride and chlorine over said ore and first maintaining the temperature thereof at a point at which one metal alone is reduced and simultaneously chlorinated and its chloride selectively volatilized; then raising the temperature progressively to the points at which each other metal in said ore is reduced and simultaneously chlorinated and its chloride selectively volatilized in ascending order of the volatilization of the chlorides of each metal in said ore.

3. Process of treating metallic oxy compounds which comprises passing chlorine and sulphur dichloride through or over the suitably heated material to form a chloridized compound of one or more of said metals, there being sufficient sulphur dichloride therein to reduce the oxy compound and there being sufficient free chlorine to chloridize the reduced metal.

4. Process of treating metallic oxy compounds which comprises passing chlorine and sulphur dichloride through or over the suitably heated material in reduction of the oxy compound with formation of a chloridized compound of the metal.

5. Process of treating metallic oxy compounds which comprises passing chlorine and a higher chloride of sulphur through or over the material heated to form a chloridized compound of one or more of said metals, there being sufficient of said chloride therein to reduce the oxy compound and sufficient free chlorine to chloridize the reduced metal.

6. Process of treating metallic oxy compounds which comprises passing chlorine and a higher chloride of sulphur through or over the suitably heated material in reduction of the oxy compound with formation of a chloridized compound of the metal.

7. Process of treating metallic oxy compounds which comprises passing chlorine and a higher chloride of sulphur through or over the suitably heated material in reduction of the oxy compound with formation of a chloridized compound of the metal, the produced chloridized compound being formed and volatilized at a different temperature from the boiling point of the normal chloride of the same metal.

In testimony whereof, I have hereunto set my hand this 7th day of May, 1929.

LESLIE G. JENNESS.